United States Patent
Schneider

(10) Patent No.: US 8,352,484 B1
(45) Date of Patent: Jan. 8, 2013

(54) SYSTEMS AND METHODS FOR HASHING EXECUTABLE FILES

(75) Inventor: Scott Schneider, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 161 days.

(21) Appl. No.: 12/830,101

(22) Filed: Jul. 2, 2010

(51) Int. Cl.
G06F 17/30 (2006.01)

(52) U.S. Cl. .................................. 707/758; 717/106
(58) Field of Classification Search .................. 707/101, 707/812, 706, 200, 664, 802, 102, 709, 783; 726/23, 24, 22
See application file for complete search history.

(56) References Cited

U.S. PATENT DOCUMENTS

| | | | |
|---|---|---|---|
| 7,509,346 B2* | 3/2009 | Mathew | 1/1 |
| 7,673,341 B2* | 3/2010 | Kramer et al. | 726/23 |
| 7,707,634 B2* | 4/2010 | Sandu et al. | 726/24 |
| 7,801,915 B2* | 9/2010 | Kanayama et al. | 707/783 |
| 7,854,002 B2* | 12/2010 | Mohanan et al. | 726/22 |
| 8,161,548 B1 | 4/2012 | Wan | 726/22 |
| 2005/0192990 A1* | 9/2005 | Kharitidi et al. | 707/101 |
| 2008/0097972 A1* | 4/2008 | Gordon | 707/3 |
| 2010/0077479 A1* | 3/2010 | Viljoen | 726/23 |
| 2011/0167493 A1* | 7/2011 | Song et al. | 726/23 |
| 2011/0276607 A1* | 11/2011 | Surna et al. | 707/812 |

OTHER PUBLICATIONS

Hash function-Wikipedia; http://en.wikipedia.org/Hash_function#Data_normalization; taken from site on Apr. 5, 2010.
Danilo Bruschi; Code Normalization for Self-Mutating Malware, Mar./Apr. 2007, pp. 46-54, vol. 5 No. 2, http://doi.ieeecomputersociety.org/10.1109/MSP.2007.31, taken from site on May 25, 2010.

* cited by examiner

Primary Examiner — James Trujillo
Assistant Examiner — Thong Vu
(74) Attorney, Agent, or Firm — Advantedge Law Group

(57) ABSTRACT

A method for hashing executable files may include identifying an executable file comprising non-variable executable content that contributes to the functionality of the executable file and does not vary among instances of the executable file. The method may also include identifying, within the executable file, non-executable content that does not contribute to the functionality of the executable file. The method may further include creating a normalized executable file by normalizing at least a portion of the non-executable content of the executable file without normalizing the non-variable executable content of the executable file. The method may include calculating a hash value that represents the normalized executable file. Various other methods, systems, and computer-readable media are also disclosed herein.

20 Claims, 5 Drawing Sheets

SYSTEMS AND METHODS FOR HASHING EXECUTABLE FILES

BACKGROUND

Antivirus and antispyware solutions generally employ traditional scan-based technologies to identify viruses, worms, Trojan horses, spyware, and other malware on an endpoint device. Typical antivirus and antispyware solutions may detect these threats by searching a system for files that match characteristics (e.g., malware signatures) of a known threat. Such security solutions may also avoid false positives by determining whether a file matches characteristics of a known-good file.

As the number of malware threats increase, the sizes of signature databases that identify malware threats and known-good files also increase. Another factor that contributes to the size of signature databases are legitimate variations in known-good files. For example, installers may rebind an executable file, thereby modifying the executable to include information about dependencies on a particular system. An executable file may also be rebased so that the executable file's base address does not interfere with other executable files on a system. Furthermore, MICROSOFT .NET native images typically vary among installations. Thus, a source executable file may correspond to numerous unique instances of the executable file.

As a result of variations in installed executables, a hash of a legitimate source executable file may not match an executable file that has been modified, possibly resulting in a false positive malware detection. Additional signatures may be added to a signature database to cover variations between executables, but many variations may be difficult to account for. Furthermore, large signature databases may be undesirable. For example, adding signatures to a signature database on a client device may result in an increased disk footprint and additional consumption of CPU cycles and memory during malware scans. Similarly, server-side lookups may take longer and consume more resources as server-side signature databases grow. Furthermore, the larger the database, the higher the likelihood of triggering false positive detections.

Some traditional security solutions may attempt to account for variations among executable files by zeroing out portions of an executable file that may vary among instances of the executable file. Unfortunately, malicious programmers may evade detection by placing malicious code in executable sections that are zeroed out. What is needed, therefore, is a more secure and effective mechanism for generating consistent hash files for varying instances of executable files.

SUMMARY

As will be described in greater detail below, the instant disclosure generally relates to systems and methods for hashing executable files. For example, a method for hashing executable files may include: 1) identifying an executable file comprising non-variable executable content that contributes to the functionality of the executable file and does not vary among instances of the executable file; 2) identifying, within the executable file, non-executable content that does not contribute to the functionality of the executable file; 3) creating a normalized executable file by normalizing at least a portion of the non-executable content of the executable file without normalizing the non-variable executable content of the executable file; and 4) calculating a hash value that represents the normalized executable file.

In at least one embodiment, the method may include identifying variable executable content that contributes to the functionality of the executable file and may vary among the instances of the executable file, validating the variable executable content by determining that the variable executable content includes one or more expected values, and after validating the variable executable content, normalizing the variable executable content. Additionally or alternatively, the method may include identifying variable executable content that contributes to the functionality of the executable file and may vary among the instances of the executable file and canonicalizing the variable executable content to provide a non-variable representation of the variable executable content.

According to certain embodiments, creating the normalized executable file may include normalizing one or more portions of the executable file that may vary among instances of the executable file. For example, creating the normalized executable file may include modifying a virtual address in the executable file to create a relative virtual address that does not vary among instances of the executable file. Creating the normalized executable file may also include normalizing at least one import table in the executable file, normalizing an image base in a header of the executable file, normalizing debug data in the executable file, normalizing icons in the executable file, normalizing security certificate data in the executable file, and/or normalization of various other portions of an executable file. Creating the normalized executable file may additionally or alternatively include normalizing at least a portion of a signature digest of the executable file, normalizing an identifier of an assembly associated with the executable file, and/or normalizing a dependency hash value. In some embodiments, creating the normalized executable file may include normalizing substantially all of the non-executable content of the executable file. In certain embodiments, creating the normalized executable file may include refraining from normalizing substantially all of the non-variable executable content in the executable file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
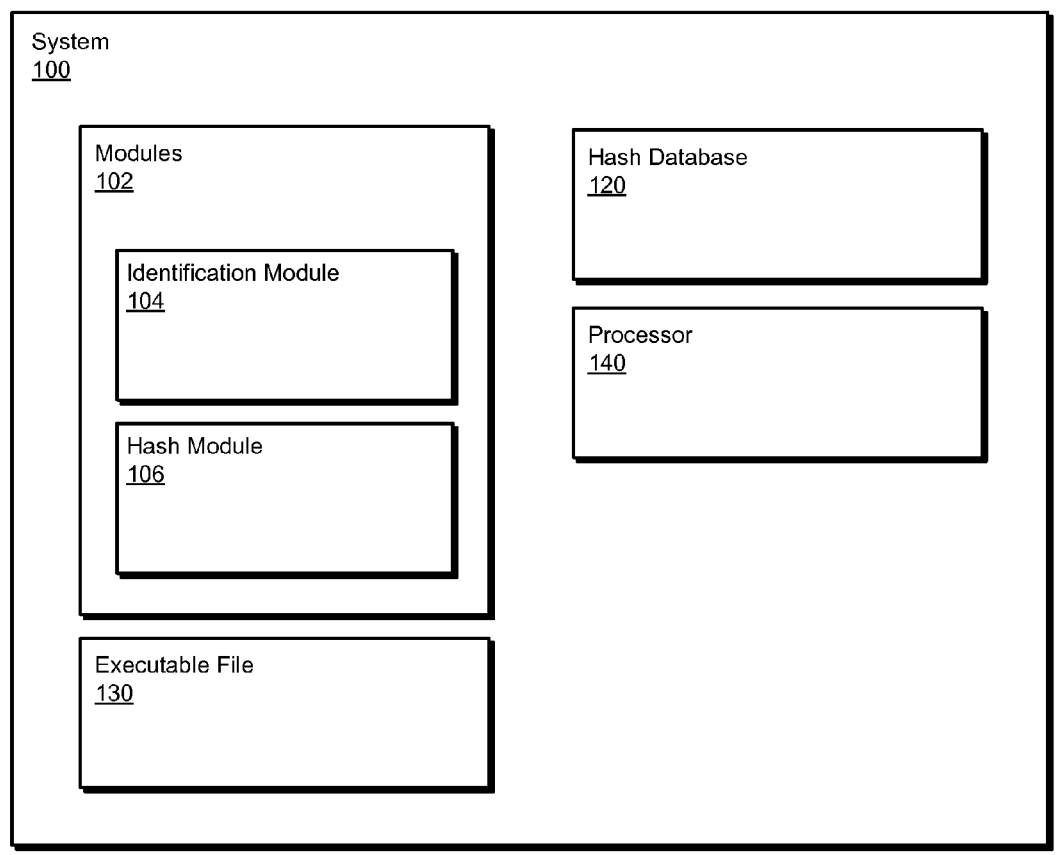
FIG. 1 is a block diagram of an exemplary system for hashing executable files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for hashing executable files. Embodiments of the instant disclosure may normalize portions of an executable file that may vary among instances of the executable file without creating blind spots in the executable file where malicious code may be hidden. For example, substantially all of the non-executable content of an executable file may be normalized while substantially all of the non-variable executable content in the executable file may be retained.

Figure 2:
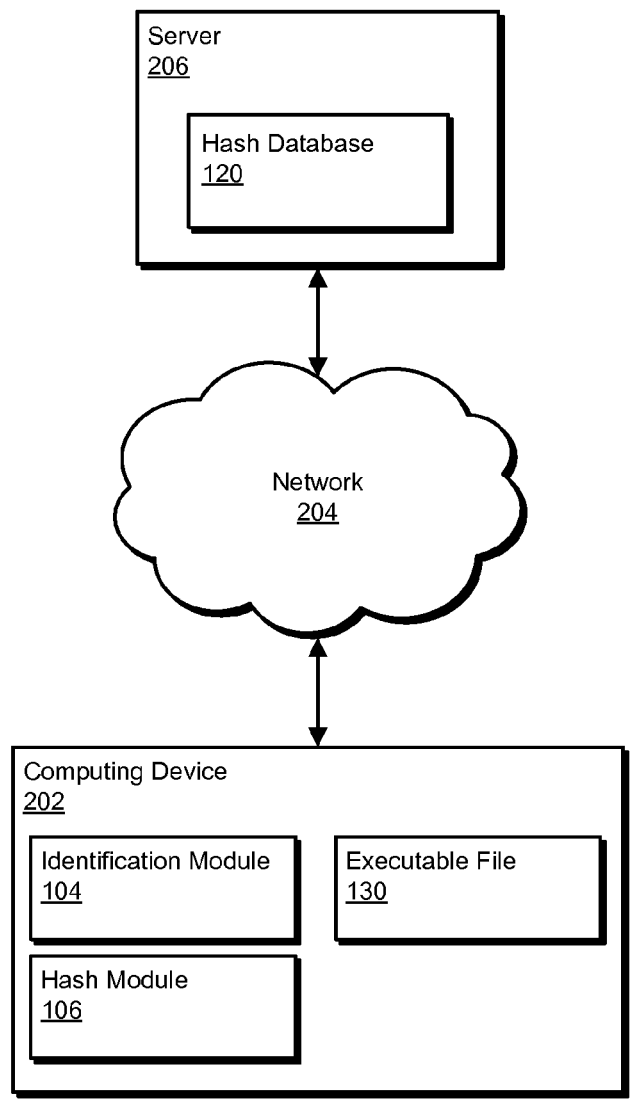
FIG. 2 is a block diagram of another exemplary system for hashing executable files.

The following will provide, with reference to FIGS. 1-2, detailed descriptions of exemplary systems for hashing executable files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for hashing executable files. As illustrated in this figure, exemplary system 100 may include one or more modules 102 for performing one or more tasks. For example, and as will be explained in greater detail below, exemplary system 100 may include an identification module 104 programmed to identify an executable file comprising non-variable executable content that contributes to the functionality of the executable file and does not vary among instances of the executable file. Identification module 104 may also be programmed to identify, within the executable file, non-executable content that does not contribute to the functionality of the executable file.

Exemplary system 100 may also include a hash module 106 programmed to create a normalized executable file by normalizing at least a portion of the non-executable content of the executable file without normalizing the non-variable executable content of the executable file. Hash module 106 may also be programmed to calculate a hash value that represents the normalized executable file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system may also include a processor 140 configured to execute identification module 104 and hash module 106. Processor 140 generally represents any type or form of processing unit capable of processing data or interpreting and executing instructions. For example, processor 140 may include processor 414 shown in FIG. 4.

As illustrated in FIG. 1, exemplary system 100 may also include a hash database 120 for storing one or more hashes of files. Hash database 120 may represent portions of a single database or computing device or a plurality of databases or computing devices. For example, hash database 120 may represent a portion of server 206 in FIG. 2, computing system 410 in FIG. 4, and/or portions of exemplary network architecture 500 in FIG. 5. Alternatively, hash database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

As shown in FIG. 1, exemplary system 100 may include an executable file 130. As used herein, the phrase "executable file" generally refers to any set of one or more computer-executable instructions. Examples of executable files include portable executables (i.e., executable files, such as WINDOWS Portable Executables, that may run in various environments of operating system software architecture), native images (i.e., executable files, such as WINDOWS .NET Native Images, created by pre-compiling an assembly).

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing device 202 in communication with a server 206 via a network 204. Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Server 206 generally represents any type or form of computing device that is capable of providing security services to computing device 202. Examples of server 206 include, without limitation, application servers and database servers configured to provide various anti-virus and/or other anti-malware services.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing device 202 and server 206.

Server 206 may include hash database 120 and computing device 202 may include identification module 104, hash module 106, and executable file 130. While hash database 120 is shown on server 206 in FIG. 2, hash database 120 may also be located locally on computing device 202. Hash database 120 may be used during a scan of computing device 202 to determine whether computing device 202 is infected with malware. For example, computing device 202 may compare a hash of executable file 130 to one or more hashes in hash database 120 to determine whether executable file 130 includes malware. The hash of executable file 130 may be created in accordance with embodiments of the instant disclosure, as discussed in greater detail in the disclosure corresponding to FIG. 3.

Figure 3:
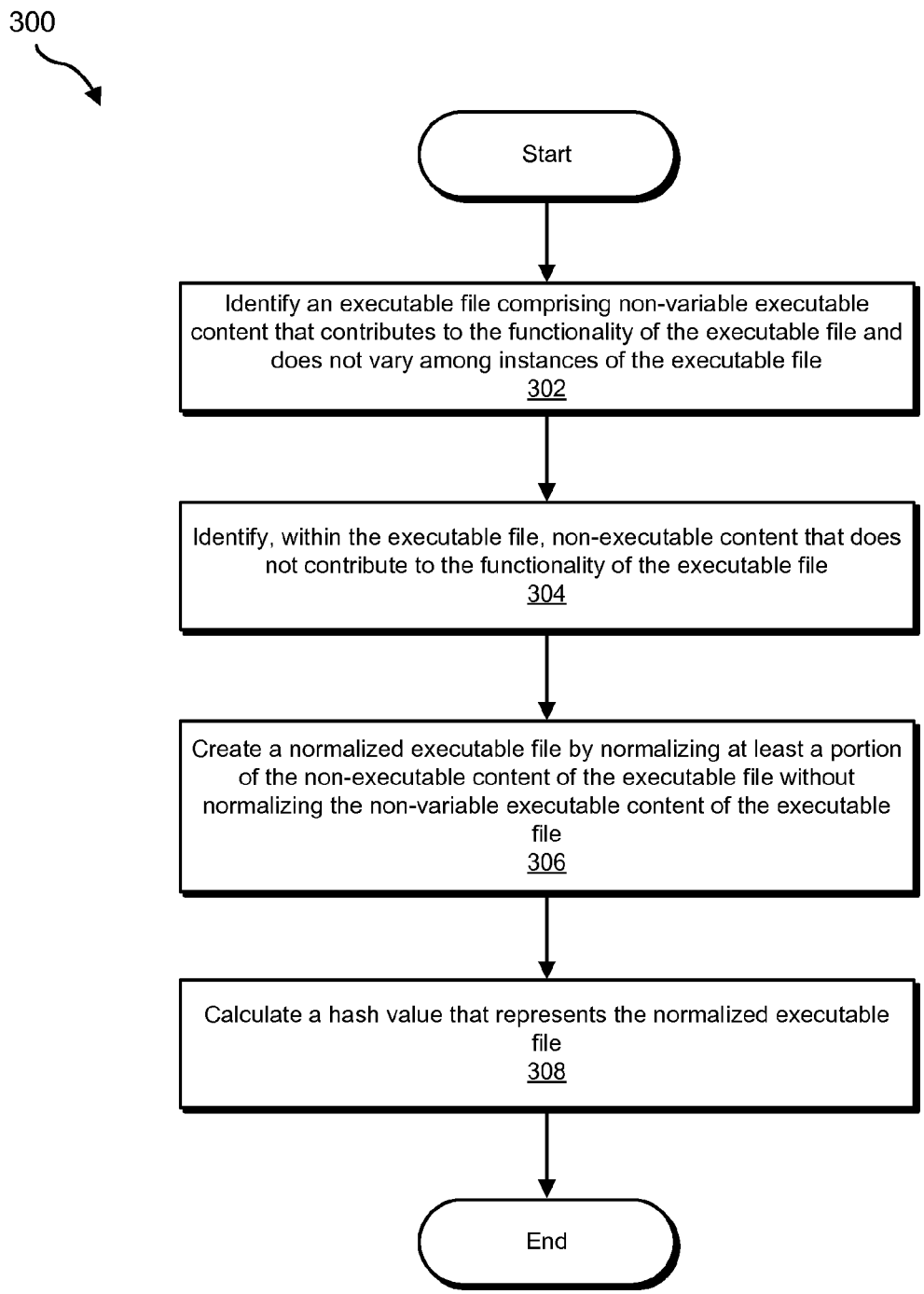
FIG. 3 is a flow diagram of an exemplary method for hashing executable files.

FIG. 3 is a flow diagram of an exemplary computer-implemented method 300 for hashing executable files. The steps in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify an executable file with non-variable executable content that contributes to the functionality of the executable file and does not vary among instances of the executable file. For example, identification module 104, as part of computing device 202, may identify executable file 130.

Identification module 104 may identify executable file 130 in a variety of contexts. In some embodiments, identification module 104 may identify executable file 130 on computing device 202 as part of a security scan (e.g., a scan looking for malware computing device 202). Such a malware scan may be performed at any suitable time. In some embodiments, malware scans may be performed at regular intervals (e.g., daily, weekly, monthly, etc.) or may be initiated by users at random times. Executable file 130 may also be identified as part of any other process looking for known-good files and/or malware.

As noted, executable file 130 may include non-variable executable content. As used herein, the phrase "non-variable content" generally refers to any type or form of content in an executable file that does not vary among instances of the executable file. For example, non-variable content may include content that is not changed during a rebinding processes, a refactoring processes, and/or any other process that results in goodware polymorphism. In other words, non-variable content may include content that does not vary between different installations or other instances of an executable file.

As used herein, the phrase "executable content" generally refers to any content that may contribute to the functionality of an executable file. For example, executable content may include computer-executable instructions and/or any other data (e.g., declarations, pointers, etc.) that a processor may read and use while executing the executable file.

At step 304 in FIG. 3, one or more of these systems described herein may identify, within the executable file, non-executable content that does not contribute to the functionality of the executable file. For example, identification module 104 may identify non-executable content within executable file 130. Identification module 104 may identify non-executable content within executable file 130 in a variety of contexts. For example, identification module 104 may identify non-executable content in executable file 130 as part of a process of hashing executable file 130.

As used herein, the phrase "non-executable content" generally refers to any content in an executable file that does not contribute to the functionality of the executable file. In other words, non-executable content may be content that a processor does not access while an executable file is running. Examples of non-executable content may include executable file header information, debugging information, comments, and/or any other information in an executable file that is not accessed by a processor while the executable file is running.

At step 306 in FIG. 3, one or more of the systems described herein may create a normalized executable file by normalizing at least a portion of the non-executable content of the executable file without normalizing the non-variable executable content of the executable file. For example, hash module 106 may create a normalized executable file by normalizing non-executable content of executable file 130 without normalizing non-variable executable content of executable file 130. Hash module 106 may create a normalized executable file using any suitable algorithm and/or heuristic.

As used herein, the term "normalize" generally refers to any process for making a portion of an executable file regular and consistent. Thus, a normalized portion of an executable file may not vary among instances of the executable file. A portion of an executable file may be normalized in a variety of ways. For example, hash module 106 may normalize a portion of an executable file by replacing data in the executable file with a predetermined constant (e.g., by zeroing out data). Hash module 106 may also normalize a portion of an executable file by canonicalizing data in the executable file, creating relative values for variable data in the executable file, and/or using any other suitable algorithm or heuristic.

In some embodiments, hash module 106 may identify variable executable content that contributes to the functionality of the executable file. As used herein, the phrase "variable executable content" generally refers to any executable content that may vary among instances of an executable file. Hash module 106 may deal with such variable executable content by normalizing it. As an example, hash module 106 may validate the variable executable content by determining that the variable executable content contains one or more expected values. For example, hash module 106 may determine whether a pointer refers to legitimate code, and if it does, hash module 106 may zero out the pointer.

In some embodiments, hash module 106 may canonicalize variable executable content to provide a non-variable representation of the variable executable content. For example, hash module 106 may reorder portions of the variable executable content to canonicalize it in an expected pattern such that the canonicalized representation of the variable executable content does not vary between instances of an executable file.

In some embodiments, hash module 106 may normalize an executable file by normalizing any portion of the executable file. In certain embodiments, hash module 106 may create the normalized executable file by normalizing substantially all of the non-executable content of the executable file. Hash module 106 may normalize substantially all of the non-executable content of the executable file by normalizing most or all of the non-executable content in an executable file. Additionally or alternatively, creating the normalized executable file may include refraining from normalizing substantially all of the non-variable executable content in the executable file and/or refraining from normalizing any of the non-variable executable content in the executable file. For example, hash module 106 may refrain from normalizing most or all of the non-variable executable content in an executable file. In some embodiments, hash module 106 may refrain from normalizing any portion of the non-variable executable content in the executable file.

In certain embodiments, hash module 106 may create a normalized executable file by modifying a virtual address in the executable file to create a relative virtual address that does not vary among instances of the executable file. As an example, hash module 106 may read a base relocation table of executable file 130 to find one or more virtual addresses and may normalize these virtual addresses by subtracting an image base from the virtual addresses. Performing this subtraction may normalize virtual addresses into relative virtual addresses. Such a process may be more secure than simply zeroing out the virtual addresses, because if the virtual addresses are zeroed out, an attacker may use virtual address locations to embed malicious code without being detected.

As another example, hash module 106 may create the normalized executable file by normalizing at least one import table in the executable file. For example, when an executable file is rebound it may store information about its dependency Dynamic Link Libraries (DLLs). Such information may be stored in a bound import table directory entry in a Portable Executable (PE) header, in a bound import table, and/or in an import address table. In some embodiments, the sections may be normalized by zeroing out the bound import table directory entry in the executable file headers, by zeroing out the bound import table contents in the executable file, and/or by zeroing out the import address table in the executable file.

Another type of table that may be normalized is an important name table, which is similar to import address table. While a loader may overwrite an import address table with addresses of imported functions, an import name table may be read-only. The import name table may point to names of imported functions and a guess at the ordinal number for each imported function. When an operating system binds an executable, the operating system may search dependencies for the named import functions using the ordinal guesses as hints. These ordinal guesses may be normalized (e.g., zeroed out).

In some embodiments, hash module 106 may normalize one or more portions of a header of an executable file. For example, a checksum value in an executable file header may be normalized. Time and/or date stamps in a header of an executable file may also be normalized. Time and date stamps may also be found in other locations, such as import and export tables, a debug table, and/or various other locations in a resource tree, and may be normalized in each of these locations.

In some embodiments, hash module 106 may normalize the data between Disk Operating System (DOS) and Portable Executable (PE) headers, which may include a rich signature. Hash module 106 may additionally or alternatively normalize user-defined resource identifiers.

In some embodiments, hash module 106 may normalize portions of an executable file that may be rebased. An executable file may be rebased so that its address base does not collide with other executable files on a system. Such rebasing may reduce an executable file's load time by avoiding address space collisions, but may also result in variable content in an executable file. Hash module 106 may normalize a rebased executable file in a variety of ways. For example, hash module 106 may normalize an image base in an executable header. As previously mentioned, hash module 106 may also normalize virtual addresses into relative virtual addresses.

According to various embodiments, hash module 106 may normalize portions of an executable file by normalizing debug data in an executable file. Various types of debug data may be normalized. For example, debug data for a particular type of debugger may be normalized and/or all debug data may be normalized. Hash module 106 may additionally or alternatively normalize icons in a resource section and/or icons in any other portions of an executable file.

In certain embodiments, hash module 106 may normalize certificate and/or license information in an executable file. For example, hash module 106 may normalize data in a certificates directory of an executable file. Hash module 106 may normalize some or all of the information in a certificates directory. In some embodiments, hash module 106 may normalize Public Key Cryptography Standards ("PKCS") certificates in a certificates directory. Some certificates directories may also include license information, and hash module 106 may normalize such license information.

Security and/or certificates directories may contain a series of chunks of data each beginning with a header (e.g., a WIN_CERTIFICATE header) of a predefined length and data type. Hash module 106 may normalize the data following such a header if it is a PKCS certificate and/or if it is smaller than 1 kilobyte in length.

Hash module 106 may be programmed to optimize normalization for native images (e.g., MICROSOFT .NET Native Images). A MICROSOFT .NET application may be built from source files (e.g., VB.net, C#, etc.) as an assembly. This assembly may be a portable executable file that contains MICROSOFT instruction language byte code and other information. When a .NET application is installed on an endpoint, an installer may store the assembly on the endpoint system. Assemblies are typically just-in-time compiled (JITed) into machine code when they are run. However, .NET and Common Language Runtime (CLR) may provide a mechanism for pre-compiling assemblies to create a native image.

The exact contents of a native image may depend on the original assembly, compilation options, version, contents of dependency assemblies and native images, the endpoint's hardware and operating system, and/or other factors. Typically, native images are not distributed, but rather generated on each end point. Thus, a significant number of native images with one or more variations may come from a single assembly.

Hash module 106 may implement various algorithms to normalize variations in native images. In some embodiments, hash module 106 may normalize at least a portion of a signature digest of a native image. For example, hash module 106 may normalize a strong name signature area that has a digest that verifies the native image assembly has not been tampered with. Hash module 106 may additionally or alternatively normalize an identifier of an assembly associated with the executable file.

According to various embodiments, hash module 106 may normalize various types of metadata, such as .NET classes, types, and other related metadata in an assembly. For example, hash module 106 may normalize a Module Version Identifier (MVID). An MVID may represent a globally unique identifier for an assembly that is different each time an assembly is built even if nothing else in the assembly changes. Hash module 106 may also normalize dependency hash values pointed to by file table rows. In some embodiments, hash module 106 may normalize reorder rows in an assembly reference table. Hash module 106 may also sort entries in #Strings and may make corresponding changes to string indexes and metadata tables.

Native images may include a .EXTREL (external relocations) section that includes one or more chunks of data that start with three bytes. These chunks may be rearranged and the bytes may be normalized by sorting them (e.g., canonicalizing them).

In some embodiments, the first header for native image information may be a managed native header location. Based on the length of the managed native header, hash module 106 may determine which native image version is being used and may apply normalizations specific to that particular version.

In some embodiments, hash module 106 may normalize, in a managed native header information section, one or more flags associated with information on an assembly that the native image originated from. Additionally or alternatively, hash module 106 may determine whether a pointer in a native image points outside a virtual address range of the current native image and may normalize the pointer if it points outside the address range. Hash module 106 may normalize such pointers because they may point to other native images that result in variations in the native image being normalized.

In some embodiments, hash module 106 may identify call, move, and/or compare instructions in a native image. When hash module 106 finds such instructions, hash module 106 may normalize operands in the instructions because the operands may point into other native images with dependencies, which may cause variations in the native image being normalized.

Hash module 106 may normalize sections of a file that may vary as a result of a restoration process being performed on the file. For example, when an infected file is repaired, the repaired file may not be restored to exactly the same state as the original, uninfected file. Hash module 106 may normalize various sections of a repaired file. In some embodiments, hash module 106 may normalize portions of a header of a repaired file. For example, hash module 106 may normalize data in a DOS header (e.g., reserved fields, fields for OEM data, etc.) of a repaired file. Hash module 106 may additionally or alternatively normalize data between the DOS and PE headers of an executable file. For example, hash module 106 may normalize version information, OS version, and/or various other sections that may change when a file is repaired.

Hash module 106 may normalize a size of image field (e.g., a field that indicates the size of the executable's virtual address range when it is loaded into memory) of a repaired executable. Hash module 106 may also normalize section header information of a repaired file. For example, when malware infects a file, the malware may add a section at the end of the file and a section header identifying the new section. An antimalware solution may repair the infected file by decrementing the number of sections and leaving the section header created by the malware in place. In such situations, hash module 106 may normalize the section header added by the malware.

As step 308 in FIG. 3, one or more of the systems described herein may calculate a hash value that represents the normalized executable file. For example, hash module 106 may calculate a hash value that represents a normalized version of executable file 130. As used herein, the phrase "hash value" generally refers to any representation, fingerprint, signature, or other information that represents and/or identifies a file. Examples of hash values include cryptographic hashes such as MD5, SHA1, and/or various other types of hash values. As previously noted, the hash value may be compared against signatures for known-good files and/or malware files during a scan of a computing system. By improving normalization of executable files, embodiments of the instant disclosure may create hash values of normalized executable files that result in fewer false positive detections and/or false negative detections during malware scans.

Figure 4:
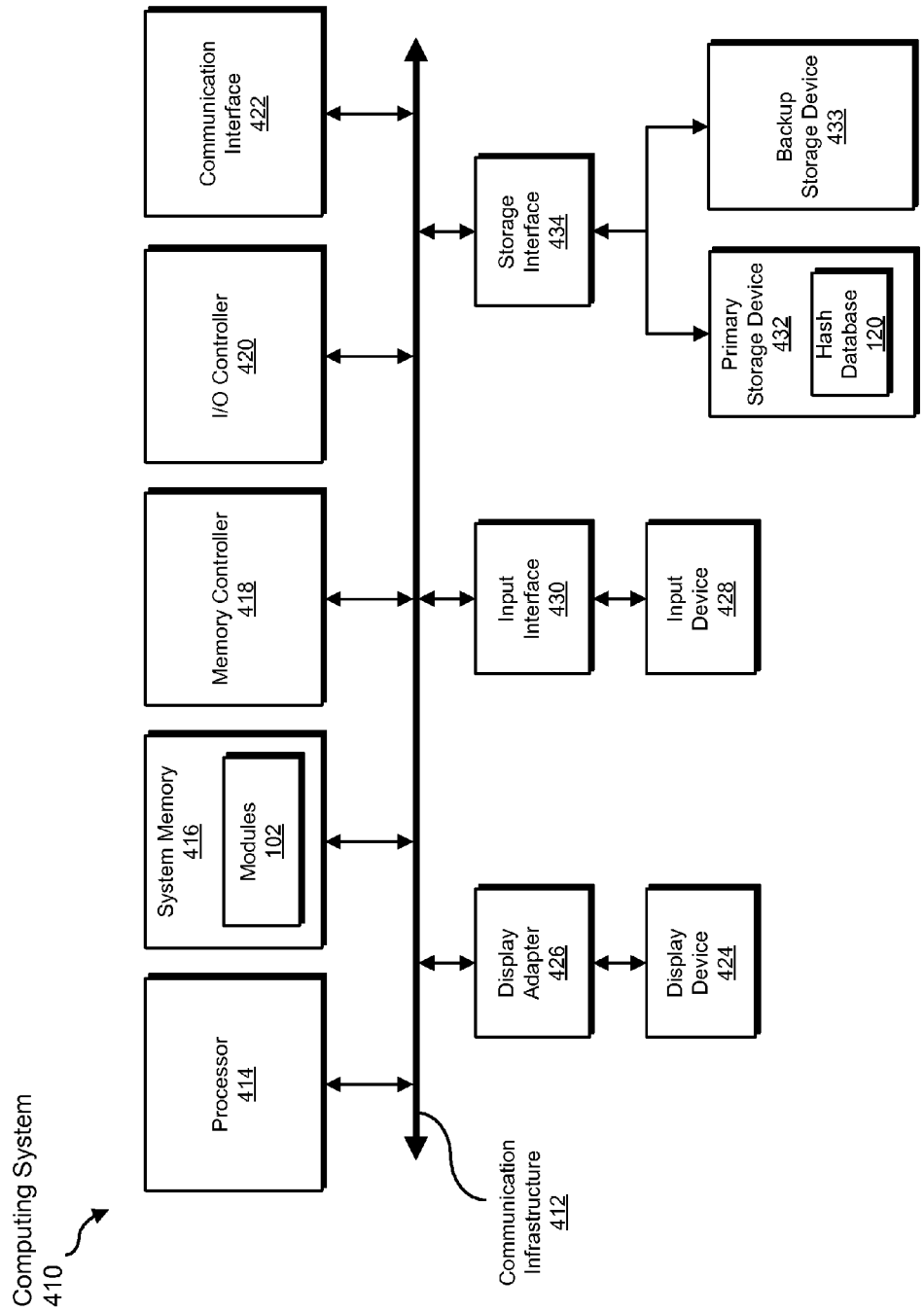
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, creating, calculating, determining, validating, normalizing, canonicalizing, and/or modifying steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as identifying, creating, calculating, determining, validating, normalizing, canonicalizing, and/or modifying.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, creating, calculating, determining, validating, normalizing, canonicalizing, and/or modifying steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, creating, calculating, determining, validating, normalizing, canonicalizing, and/or modifying steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, creating, calculating, determining, validating, normalizing, canonicalizing, and/or modifying steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, hash database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, creating, calculating, determining, validating, normalizing, canonicalizing, and/or modifying steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
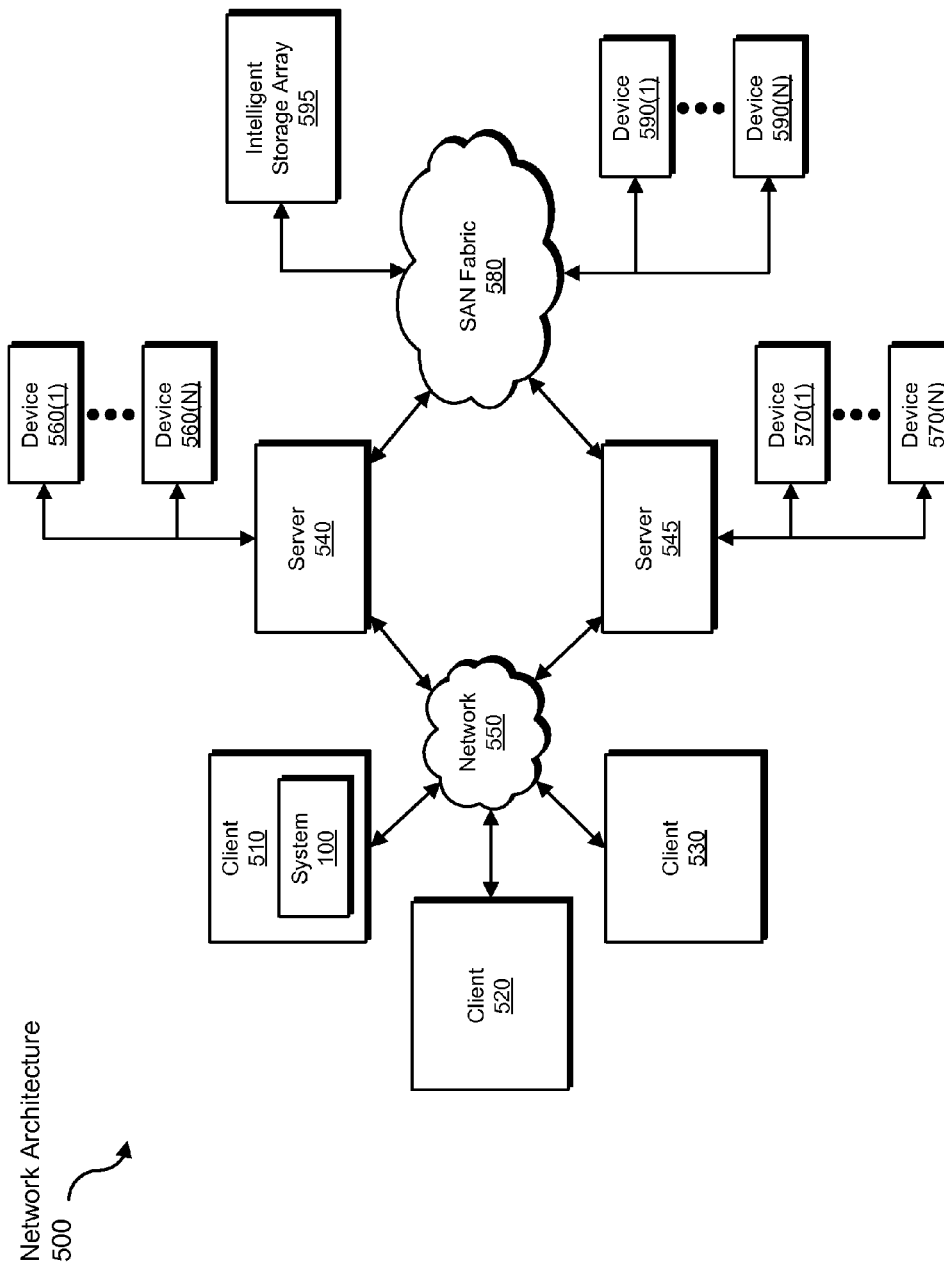
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, creating, calculating, determining, validating, normalizing, canonicalizing, and/or modifying steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for hashing executable files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, hash module 106 may transform an executable file into a normalized executable before hashing the executable file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for hashing executable files, at least a portion of the method being performed by a computing device comprising at least one processor, the method comprising:
    identifying an executable file comprising non-variable executable content that contributes to the functionality of the executable file and does not vary among instances of the executable file;
    identifying, within the executable file, non-executable content that does not contribute to the functionality of the executable file;
    identifying, within the executable file, variable executable content that contributes to the functionality of the executable file and that may vary among the instances of the executable file;
    validating the variable executable content by determining that the variable executable content comprises and/or refers to legitimate code, wherein the legitimate code comprises known-good code and/or a non-malware variation of known-good code;
    creating a normalized executable file by normalizing at least a portion of the non-executable content of the executable file and normalizing the variable executable content of the executable file without normalizing the non-variable executable content of the executable file;
    calculating a hash value that represents the normalized executable file.

2. The computer-implemented method of claim 1, wherein:
    creating the normalized executable file comprises normalizing substantially all of the non-variable executable content of the executable file while retaining substantially all of the non-executable content of the executable file.

3. The computer-implemented method of claim 1, wherein normalizing the variable executable content comprises:
    canonicalizing the variable executable content to an expected pattern to provide a non-variable representation of the variable executable content.

4. The computer-implemented method of claim 1, wherein the non-executable content comprises content that the processor does not access while the executable file is running.

5. The computer-implemented method of claim 1, wherein normalizing the variable executable content comprises: modifying a virtual address in the executable file to create a relative virtual address that does not vary among the instances of the executable file by:
    reading a base relocation table of the executable file to find the virtual address;
    subtracting an image base of the executable file from the virtual address to create the relative virtual address.

6. The computer-implemented method of claim 1, wherein creating the normalized executable file comprises at least one of:
    normalizing at least one import table in the executable file;
    normalizing an image base in a header of the executable file;
    normalizing debug data in the executable file;
    normalizing icons in the executable file;
    normalizing security certificate data in the executable file.

7. The computer-implemented method of claim 1, wherein creating the normalized executable file comprises at least one of:
    normalizing at least a portion of a signature digest of the executable file;
    normalizing an identifier of an assembly associated with the executable file;
    normalizing a dependency hash value.

8. The computer-implemented method of claim 1, wherein creating the normalized executable file comprises:
    normalizing substantially all of the non-executable content of the executable file.

9. The computer-implemented method of claim 1, wherein creating the normalized executable file comprises refraining from normalizing substantially all of the non-variable executable content of the executable file.

10. The computer-implemented method of claim 1, wherein creating the normalized executable file comprises:
    identifying dynamic link library information stored in the executable file when the executable file is rebound;
    normalizing the dynamic link library information.

11. The computer-implemented method of claim 1, wherein creating the normalized executable file comprises:
    identifying ordinal number guesses for imported functions in the executable file;
    normalizing the ordinal number guesses.

12. A system comprising:
    an identification module programmed to:
        identify an executable file comprising non-variable executable content that contributes to the functionality of the executable file and does not vary among instances of the executable file;
        identify, within the executable file, non-executable content that does not contribute to the functionality of the executable file;
        identify, within the executable file, variable executable content that contributes to the functionality of the executable file and that may vary among the instances of the executable file;
        validate the variable executable content by determining that the variable executable content comprises and/or refers to legitimate code, wherein the legitimate code comprises known-good code and/or a non-malware variation of known-good code;
    a hash module programmed to hash the executable file by:
        creating a normalized executable file by normalizing at least a portion of the non-executable content of the executable file and normalizing the variable executable content of the executable file without normalizing the non-variable executable content of the executable file;
        calculating a hash value that represents the normalized executable file;
    at least one processor configured to execute the identification module and the hash module.

13. The system of claim 12, wherein:
    the hash module is programmed to create the normalized executable file by normalizing substantially all of the non-variable executable content of the executable file while retaining substantially all of the non-variable executable content of the executable file.

14. The system of claim 12, wherein:
the hash module is programmed to normalize the variable executable content by canonicalizing the variable executable content to provide a non-variable representation of the variable executable content.

15. The system of claim 12, wherein the hash module is programmed to create the normalized executable file by:
identifying dynamic link library information stored in the executable file when the executable file is rebound;
normalizing the dynamic link library information.

16. The system of claim 12, wherein the hash module is programmed to create the normalized executable file by:
modifying a virtual address in the executable file to create a relative virtual address that does not vary among the instances of the executable file.

17. The system of claim 12, wherein the hash module is programmed to create the normalized executable file by normalizing at least a portion of the non-executable content of the executable file without normalizing any non-variable executable content of the executable file.

18. The system of claim 12, wherein:
the non-executable content of the executable file comprises a header of the executable file.

19. A non-transitory computer-readable medium comprising one or more computer-executable instructions that, when executed by a computing device, cause the computing device to:

identify an executable file comprising non-variable executable content that contributes to the functionality of the executable file and does not vary among instances of the executable file;
identify, within the executable file, non-executable content that does not contribute to the functionality of the executable file;
identify, within the executable file, variable executable content that contributes to the functionality of the executable file and that may vary among the instances of the executable file;
validate the variable executable content by determining that the variable executable content comprises and/or refers to legitimate code, wherein the legitimate code comprises known-good code and/or a non-malware variation of known-good code;
create a normalized executable file by normalizing at least a portion of the non-executable content of the executable file and normalizing the variable executable content of the executable file without normalizing the non-variable executable content of the executable file;
calculate a hash value that represents the normalized executable file.

20. The non-transitory computer-readable medium of claim 19, wherein the one or more computer-executable instructions are programmed to create the normalized executable file by normalizing at least a portion of the non-executable content of the executable file without normalizing any non-variable executable content of the executable file.

* * * * *